United States Patent [19]

St. John

[11] 4,341,167

[45] Jul. 27, 1982

[54] ENERGY CONSERVING HEATING AND COOLING SYSTEM FOR PRINTING PLANT

[76] Inventor: Eric P. St. John, 778 Chenango St., Binghamton, N.Y. 13901

[21] Appl. No.: 201,984

[22] Filed: Oct. 29, 1980

[51] Int. Cl.$^3$ .............................................. B09B 3/00

[52] U.S. Cl. .................................... 110/235; 34/32; 34/72; 110/210; 110/236; 110/254; 432/72

[58] Field of Search ............... 110/235, 236, 237, 254, 110/346, 203, 210; 34/32, 72; 432/72; 431/5

[56] References Cited

U.S. PATENT DOCUMENTS

| | | | |
|---|---|---|---|
| 3,675,600 | 7/1972 | Jones | 110/8 R |
| 3,728,797 | 4/1973 | Worden, Jr. et al. | 34/32 |
| 3,905,126 | 9/1975 | Villalobos et al. | 34/72 |
| 4,017,254 | 4/1977 | Jones | 110/233 X |
| 4,087,923 | 5/1978 | Wilt, Jr. | 34/32 |
| 4,198,764 | 4/1980 | Ellison et al. | 110/203 X |

*Primary Examiner*—Edward G. Favors

[57] ABSTRACT

A low-cost energy-conserving system for heating and cooling the equipment and environment of a manufacturing installation, and more particularly, a printing plant, including an incinerator for burning waste paper generated as a result of the printing process, a first heat exchanger for utilizing exhaust gases from the incinerator for heating air to be supplied to a heat treating device or apparatus, and more particularly, a web press oven, first ductwork for conducting heated air from the first heat exchanger to the web press oven for heating purposes, second ductwork for conducting solvent-laden air from the web press oven to the incinerator where the solvents are burned to utilize their heating value and to also produce pollution-free gases, a second heat exchanger utilizing exhaust gases from the incinerator for heating air to be provided to the plant for environmental heating purposes, an outside air duct for providing air to be heated by the second heat exchanger, third ductwork for conducting heated air from the second heat exchanger to various areas of the plant for comfort heating purposes, recirculating ductwork associated with the third ductwork for recirculating environmental air to the third ductwork, controls for varying the amount of outside air and recirculated air which is supplied to the third ductwork, a well for providing cooling water to a cooling coil in the third ductwork for dehumidification and cooling purposes, and conduits for returning used cooling water to a recharge well in an uncontaminated state.

12 Claims, 1 Drawing Figure

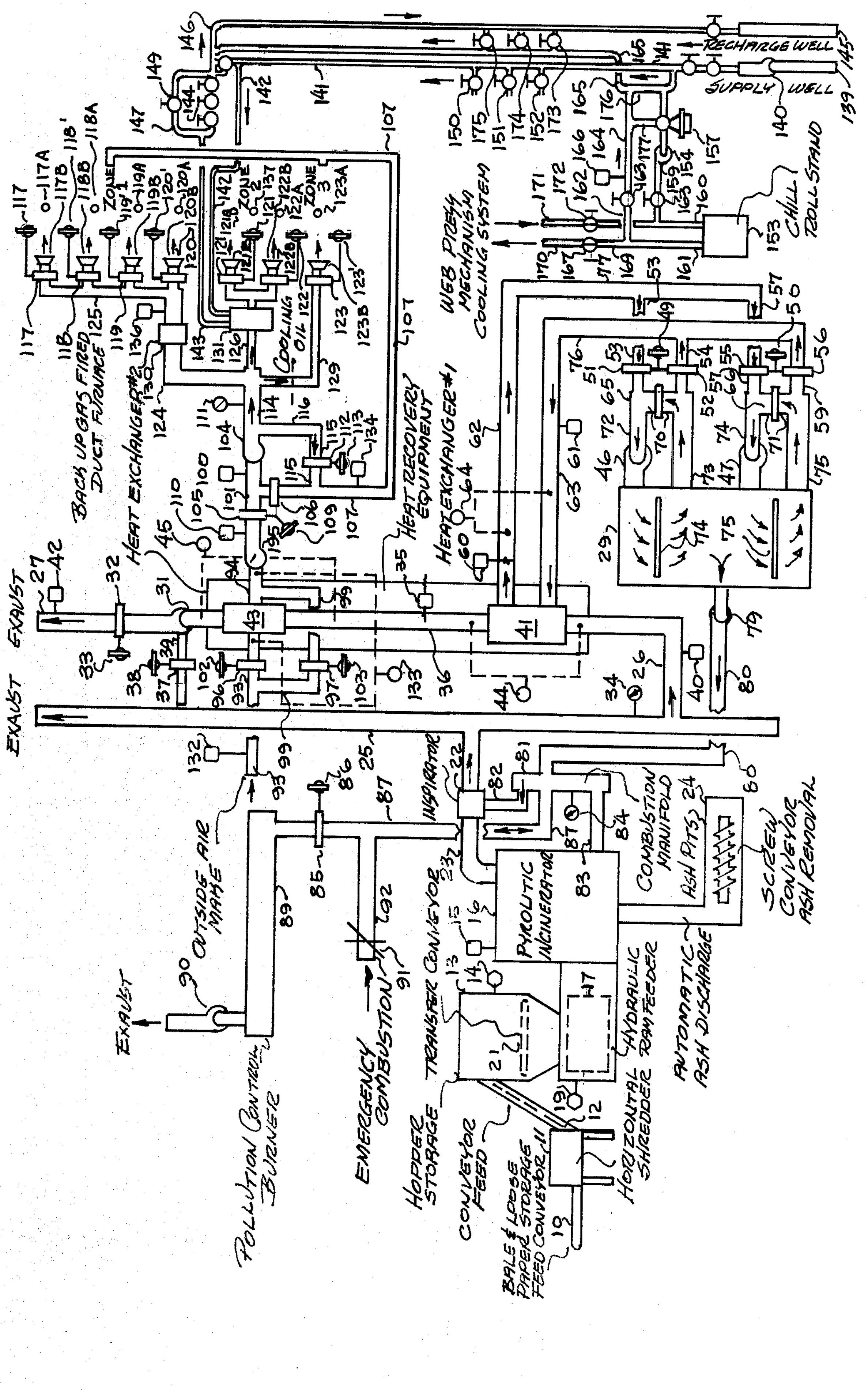
RECHARGE WELL
SUPPLY WELL
CHILL ROLL STAND
WEB PRESS MECHANISM COOLING SYSTEM
BACK UP GAS FIRED DUCT FURNACE
HEAT EXCHANGER #2
HEAT RECOVERY EQUIPMENT
HEAT EXCHANGER #1
COOLING OIL
ZONE 1
ZONE 2
ZONE 3
EXAUST
EXAUST
EXAUST
OUTSIDE AIR MAKE
INSPIRATOR
COMBUSTION MANIFOLD
ASH PITS
SCREW CONVEYOR ASH REMOVAL
PYROLITIC INCINERATOR
HYDRAULIC RAM FEEDER
AUTOMATIC ASH DISCHARGE
POLLUTION CONTROL BURNER
EMERGENCY COMBUSTION
TRANSFER CONVEYOR
HOPPER STORAGE
CONVEYOR FEED
HORIZONTAL SHREDDER
BALE & LOOSE PAPER STORAGE FEED CONVEYOR

ENERGY CONSERVING HEATING AND COOLING SYSTEM FOR PRINTING PLANT

BACKGROUND OF THE INVENTION

The present invention relates to an energy conserving system for heating and cooling the equipment and environment of a manufacturing installation, and more particularly, a printing plant.

By the way of background, in a printing plant employing heat treating apparatuses such as web presses, great amounts of heat are necessary for heating the web press ovens through which printed paper webs pass for drying. In the past, these ovens have been gas fired and have therefore utilized fossil fuels. In addition, printing plants in the past have utilized various types of fossil fuels, such as coal, gas, or oil for comfort heating purposes. Also, cooling of printing plants has usually been effected by the use of refrigeration apparatus utilizing electrical energy. Considering the large size of the printing industry in the United States, large amounts of energy from fossil fuel and electrical sources were thus required.

By way of further background, large amounts of waste papers are generated by web presses used in the printing industry. In the past, this waste paper has been baled and sold or otherwise disposed of. The amount of waste paper generated by a relatively small web press printing installation has sufficient energy, when incinerated, to produce enough heat for the ovens of the web presses and for plant comfort heating requirements. In addition, cooling water from wells can be utilized for plant comfort cooling and dehumidification and for cooling the printed webs to facilitate drying.

SUMMARY OF THE INVENTION

It is accordingly one object of the present invention to provide a low-cost, energy-conserving system for heating the equipment and environment of a printing plant by incinerating waste paper generated incidental to the printing process.

Another object of the present invention is to provide an improved system for cooling the equipment and environment of a printing plant by obtaining cool water from a well on the premises of the printing plant, utilizing the cooling capacity of said water, and returning warmed cooling water to the ground in an uncontaminated state.

A further object of the present invention is to provide a low-cost, energy-conserving and anti-pollution system for heating the equipment and environment of a printing plant, wherein combustible solvent-laden air which is produced in the web press heating ovens is returned to an incinerator wherein the heating value of the solvent is utilized and where the solvents are burned to create pollution-free gases which are ultimately discharged to the atmosphere. Other objects and attendant advantages of the present invention will readily be perceived hereafter.

The present invention relates to a printing plant heating system comprising an incinerator for incinerating waste paper generated as a result of printing operations, exhaust duct means for conducting heated gases from said incinerator, a web press oven, heat exchange means for transferring heat from said heated gases in said exhaust duct means to heating air to be supplied to said web press oven, first duct means for conducting heated air from said heat exchange means to said web press oven, and second duct means for conducting solvent-laden air from said web press oven to said incinerator to burn off solvent in said solvent-laden air. In accordance with the present invention, second heat exchange means are provided for transferring heat from said heated gases in said exhaust duct means to air to be supplied for heating said printing plant, and third duct means are provied for conducting heated air from said heat exchange means to various areas of said printing plant. The present invention also includes a supply well constituting a source of cooling water, a cooling coil in said third duct means, first conduit means for supplying cooling water from said well to said cooling coil for dehumidifying heated air in said third duct means, a recharge well, and second conduit means for directing cooling water from said cooling coil to said recharge well in an uncontaminated state. Also, in accordance with the present invention, the cooling water from the supply well is used for comfort cooling of the plant in hot weather. The various aspects of the present invention will be more fully understood when the following portions of the specification are read in conjunction with the accompanying drawings wherein:

BRIEF DESCRIPTION OF THE DRAWINGS

The drawing discloses a low-cost, energy-conserving system for heating and cooling the equipment and environment of a printing plant.

DETAILED DESCRIPTION OF THE PREFERRED EMBODIMENTS

In accordance with the present invention, the waste paper which is accumulated incidental to the printing process is incinerated to supply the required heat to the web press oven or ovens and is also utilized for the purpose of heating the printing plant, thereby effectively drastically reducing the reliance on fossils fuels except for emergency use or to bring the web press ovens to operating temperature at the beginning of the printing cycle by the use of a gas-fired heating system contained within the oven. Calculations have shown that a web press printing a single web produces 250 pounds of waste papers per hour and that the system of the present invention requires approximately 500 pounds of waste paper per hour. Therefore, the waste paper from the printing of two webs, when incinerated, will produce enough heat for a two web press and for plant heating requirements. As a further energy conservation measure, plant cooling and dehumidification are achieved by the use of cooling water obtained from a deep well, and the cooling water, after use, is returned in an uncontamined state to a recharge well. The net results of all of the foregoing is that the heating and cooling costs are extremely low, and, more importantly, waste paper is utilized for these requirements instead of fossil fuels.

For heating, as noted above, scrap papers from the printing process is used. However, if desired, wood or any alternate energy source, may also be used. In this respect pallets, scrap wood or wooden crates which are normally received by the printing plant may be disposed of by incineration. In addition, if desired, baled paper may either be accumulated from the printing plant or purchased for supplementing the currently generated paperwaste which is normally used for the heating requirements. In this respect, it will be understood that during cold weather there is a greater demand for heat than in warmer months.

Loose scrap paper from the printing plant operation is collected in roller bins or the like and is provided to storage feed conveyor 10. In addition, bales of paper or any alternate energy source which are accumulated as a result of excess waste paper generation in the plant, or which are purchased, are stored proximate conveyor 10 for use as needed. The paper, and suitable wood, if used, are fed by conveyor 10 to shredder 11 which is periodically started manually. The shredded paper is fed by conveyor 12 to hopper 13 and when hopper 13 is sufficiently full, limit switch 14 shuts off conveyor 12 and shredder 11. When temperature transmitter 15 in pyrolytic incinerator section 16 senses a low temperature limit set by the incinerator manufacturer, it will initiate a charging cycle.

A typical pyrolytic incinerator system utilizing solid waste as an energy source, is commercially manufactured and available from Kelly-Hoskinson of Kelly Company, Inc., Milwaukee, Wis., and is well known in the art.

The air inlet section provides additional air through natural draft to permit ample retention time in an excess air atmosphere for complete combustion.

Once the thermal reactor section has reached proper operating temperature the combustion is self sustaining and the pilot burner can be extinquished.

In this respect, the hydraulic ram feeder 17 will retract and the charging door to the incinerator will open. Limit switch 19 senses when the charging door is fully opened and causes the transfer conveyor 21 to operate to fill the charging chamber 20 with the required amount of shredded paper. Suitable controls, not shown, will thereafter cause the charging door to close and the ram to charge the scrap paper into incinerator section 16. Temperature transmitter 15 is essentially a temperature responsive switch which will complete an electric circuit upon sensing a predetermined low temperature. The electric circuit and associated mechanism will effect a single cycle, as described above.

The pyrolytic incinerator 16 may be of the type manufactured by Kelly Co., Inc., Model 780 and it is of the type wherein the shredded paper or other material is heated to its kindling temperature in section 16 without oxygen, and thereafter excess oxygen is admitted for combustion in the secondary section 22 which is schematically shown as connected to primary section 16 by duct 23. The secondary section 22 is commonly known as an inspirator or thermal reactor. Ash waste from the incinerator is received in ash pit 24. By the use of the foregoing type of incinerator, the exhaust gases from thermal reactor 22 can be exhausted to the atmosphere, either directly or after they have passed in heat exchange relationship with web press oven heating air or plant heating air. More specifically in the foregoing respect, gases leaving thermal reactor 22 either pass directly into exhaust stack 25 for passage to the atmosphere, or a portion of these gases are drawn into duct 26 from which they are ultimately exhausted to the atmosphere through duct 27, after being used for heating purposes.

When it is desired to utilize the combustion gases for heating the web press oven 29, fan 31 is started manually for drawing hot gases into duct 26 from exhaust stack 25. A discharge damper 32 is located in exhaust duct 27 and is driven by motor 33. A pressure transmitter control 34 is in communication with exhaust duct 25 and is suitably coupled to motor 33 to modulate discharge damper 32 to maintain the required draft in exhaust stack 25. In this respect, if the pressure in stack 25 is too low, damper 32 will be moved to a more closed position, and vice versa. It will be appreciated that the amount of air flow caused by fan 31 must be within proper limits so as to maintain the draft in exhaust stack 25 at a proper value for proper operation of the incinerator because if there is too much or too little draft in exhaust stack 25, there will not be proper incineration.

A temperature transmitter 35 in exhaust duct 36, which is in communication with exhaust duct 26, senses the temperature of the exhaust gases and causes motor 38 to open or close damper 37. In this respect, the maximum temperature which can be tolerated at fan 31 is 600° F. is in the proposed embodiment, and if for any reason this temperature tends to be exceeded at temperature transmitter 35, sufficient air will be bled through conduit 39 by controlling damper 37 to maintain the temperature at the fan below 600° F. Temperature transmitter 35 includes an on-off switch which will provide a switching action to energize and deengergize motor 38 in response to the temperature in duct 36.

At this point it is to be noted that temperature sensor 40 and temperature transmitter 35 monitor the inlet and outlet exhaust gas temperature, respectively, across heat exchange 41 and that temperature transmitter 35 and temperature sensor 42 monitor the inlet and outlet exhaust gas temperatures, respectively, across heat exchanger 43. This monitoring is for the purpose of checking these values, in addition to the above-described function of temperature transmitter 35. Differential pressure sensors 44 and 45 indicate the static pressure drop across heat exchangers 41 and 43, respectively. The monitoring of the pressure drops gives an indication of the extent to which the heat exchangers might be fouled with combustion residues, and are not absolutely necessary for the efficient operation of the present invention and serves basically to indicate the continued build-up or fouling.

As noted briefly above, the heat in the exhaust gases in duct 26 is utilized for providing heat to web press oven 29 through heat exchanger 41. In the heat exchanger the exhaust gases pass through one path and the air for the web press oven pass through another path, in heat transfer relationship therewith, but the respective gases do not intermingle. Web press oven 29 is of the type through which two webs pass through the openings schematically shown at 74 and 75.

In order to provide heat to web press oven 29 for both webs, fans 46 and 47 are started. At start-up, motors 49 and 50 are energized, as a result of the closing of electrical contact on the starter switches which start fans 46 and 47. Motor 49 will cause dampers 51 and 52 in conduits 53 and 54, respectively, to open. Motor 50 will cause dampers 55 and 56 in conduits 57 and 59, respectively, to open. The dampers are either fully closed or are open to a preset level. Temperatures sensors 60 and 61, which are located in ducts 62 and 63, respectively, monitor the temperature differential across heat exchanger 41 for the purpose of providing intelligence as to the operation of the system. Differential pressure sensor 64 monitors the differential pressure across ducts 62 and 63 for the purpose or providing intelligence as to the operation of the system. Dampers 65 and 66 are located in ducts 70 and 71, respectively, and are preset to a predetermined open setting. Duct 70 is in communication with ducts 72 and 73, and duct 71 is in communication with ducts 74 and 75. Dampers 65 and 66, being preset to a certain opening, cause a predetermined amount of air to be circulated to the heat exchanger and the remainder to be circulated to the oven 29.

As noted above, oven 29 has two web openings 74 and 75 through which two webs of printed material passes through the oven. The air which is used for supplying heat to the web oven passes through web openings 74 and 75. Thus, for example, when fan 46 is in operation, it draws air from outside of the oven in through web opening 74. This air is caused to be drawn into duct 73 from which it passes into duct 54 and thence into duct 76 from which it passes into duct 63 leading to heat exchanger 41. After the air is heated in heat exchanger 41, it passes into duct 62, and then into duct 77 from which it passes into duct 53, and then to duct 72 leading to fan 46, from which it passes into oven 29. When fan 47 is in operation, ambient air is drawn into web opening 75 from which it is drawn into duct 75′ from which it passes into duct 59, duct 76 and duct 63 which leads to heat exchanger 41, and the heated air passes through duct 63, duct 77, duct 57, duct 74 and fan 47 from which it passes into oven 29.

Whenever oven 29 is in operation, exhaust fan 29 will also operate. Exhaust fan 79 conducts gases containing volatile printing solvents through duct 80 to combustion manifold 81. A certain portion of the solvent-laden gases will pass from manifold 81 into duct 82 leading to thermal reactor 22, where the volatile solvents are reburned to obtain the heating value thereof. Another portion of the gases containing volatile solvents will pass from combustion manifold 81 through duct 83 to incinerator 16, where such gases are reburned to obtain the heating value thereof. A pressure transmitter 84 is in communication with combustion manifold 81 and modulates damper 85 by controlling motor 86 associated therewith. Damper 85 is located in conduit 87 which is in communication with combustion manifold 81. It is necessary to maintain the proper pressure at combustion manifold for proper operation of the incinerator, and thus by modulating damper 85, this pressure is maintained. If damper 85 is opened to any degree, the volatile solvent-laden gases in conduit 87 are passed to pollution control burner or fume incinerator 89 where they are burned and thereafter the pollution-free combustion products are passed to the atmosphere by the operation of fan 90.

The foregoing mode of operation assumed that the incinerator was operating. However, under certain circumstances the incinerator may not be in operation, and it may be desirable to heat the web press oven 29 by the use of other fuel, such as natural gas, by the use of a gas fired oven which forms a part of the web press. When gas is used the volatile solvents in the exhaust air leading to duct 80 are all passed through the pollution control burner 89 before being exhausted to the atmosphere by fan 90.

Under certain circumstances, it may be that the incinerator sections 16 and 22 are in operation, but the web oven 29 is not. Under these circumstances combustion air for the incinerator is obtained through the opening of emergency combustion barometric damper 91 which is in duct 92 leading to duct 87 which is in communication with combustion manifold 81, which is in turn in communication with the two incinerator sections. The emergency combustion damper will open in response to the sensing of a predetermined pressure differential across the damper.

The exhaust gases from incinerator 16 and 22 are also used for plant heating. In this respect, an outside air makeup conduit 93 is in communication with heat exchanger 43 and heated air passes into conduit 94 which is in communication with fan 95. A first damper 96 is in conduit 93 and a second damper 97 is in bypass conduit 99 which is in communication with conduits 93 and 94 on opposite sides of heat exchanger 43. A temperature transmitter 100 is associated with duct 101 on the output side of fan 95. Temperature transmitter 100 modulates dampers 96 and 97 to maintain the air temperature in duct 101 at the proper value. In this respect, temperature transmitter 100 governs the operation of motors 102 and 103 which are associated with dampers 96 and 97, respectively. Thus, if the temperature in duct 101 is too low, damper 97 will close more and damper 96 will open more to cause more of the inlet air from conduit 93 to pass through the heat exchanger, and vice versa.

Fan 95, which supplies outside air to the system, is started by virtue of having its switch interlocked with main heat supply fan 104, which is placed in operation manually. Damper 105 in duct 101 modulates to a preset position upon start-up of fan 95 to allow a predetermined amount of outside air through duct 101. At this point it is to be noted that motor 109 operates damper 105 in duct 101 and damper 106 in return air duct 107. A temperature transmitter 110 is associated with duct 101 and will cause fan 95 to cease operation in the event it senses that the air temperature in duct 101 is too low. Under this condition only recirculated air will be supplied by fan 104. It is to be noted that whenever fan 95 has been shut off by temperature transmitter 110, the fan has to be restarted manually. Fan 95 will be shut off only in the event of an emergency when the temperature in duct 101 is below a predetermined value, considering that normally heat exchanger 43 will supply sufficient heat to cause temperature transmitter 110 to permit fan 95 to remain in operation. Motor 109 deprives dampers 105 and 106, and is responsive to fan 95 in the sense that when fan 95 shuts down, motor 109 closes damper 105 and opens damper 106.

A pressure transmitter 111 will modulate recirculation damper 112 by controlling motor 113 associated therewith to maintain the required pressure in conduit 114 on the outlet side of fan 104. In this respect, it can be seen that damper 112 is in duct 115 leading from duct 116 which is in communication with duct 114, and duct 115 is also in communication with duct 107. In essence, ducts 115, 116 and 107 constitute a bypass circuit. This maintaining of proper pressure in duct 114 by damper 112 is necessary as dampers 117, 118, 119, 120, 121, 122 and 123 modulate to maintain the necessary flow requirements to their respective zones. At this point it is to be noted that damper motors 117′, 118′, 119′, 120′, 121′, 122′ and 123′ are associated with dampers having a corresponding unprimed numeral. Theromostats 117*a*, 118*a*, 119*a*, 120*a*, 121*a*, 122*a* and 123*a* are associated with the heating duct outlets 117*b*, 118*b*, 119*b*, 120*b*, 121*b*, 122*b* and 123*b*, respectively, and modulate the dampers having corresponding unprimed numerals, respectively, to provide the proper temperature in the zone in which the thermostats are located. The returned air duct 107 returns air from zones 1, 2 and 3 to duct 101. As can be seen from the drawing, the heating air duct 114 is in communication with heating outlets 117*b*–120*b* through ducts 124 and 125. Duct 104 is in communication with heating duct outlets 121*b* and 122*b* throudh ducts 126 and 127. In addition, heating air duct 114 is in communication with outlet 123*b* through duct 129. Zone 1, which is associated with heating duct outlets 117*b* through 120*b* is in the web press area. Heating duct outlets 121*b* and 122*b* are in the sheet feeding area, and heating duct outlet 123*b* is in the bindery area. At this point it is to be noted that there is a back up gas fired furnace 130 associated with duct 124 to provide supplemental heat through outlets 117*b* through 120*b*, as required, in the event that there is not enough heat obtained from heat exchanger 43, as when fan 95 has been shut off in response to the sensing of too low a temperature by temperature transmitter 110. In addition, it is to be noted that there is a cooling coil 131, to be described in greater detail hereafter, in duct 126 which conduits air to the sheet feeding area zone 2. This functions to dehumidify the air.

The temperature differential across heat exchanger 43 is monitored by temperature sensor 132 and temperature transmitter 110 on the inlet and outlet sides, respectively, of the heat exchanger, and differential pressure sensor 133 monitors the static pressure across heat exchanger 43. These instruments thus monitor the performance of the system. Temperature sensor 134 monitors the temperature of the return air duct in duct 107 to indicate whether the system is performing satisfactorily.

The heating circuit includes a provision for providing auxiliary heat whenever the incinerator is not in operation or the available heat pick-up from heat exchanger 43 is such that temperature transmitter 110 shuts down fan 95. In this situation the heating system goes to an auxiliary heating mode. As noted above, damper motor 109 causes damper 105 in duct 101 to fully close. In addition, duct furnace 130 is caused to turn on to maintain the proper air temperature in duct 124 as sensed by temperature transmitter 136. This is only for zone 1. Zones 2 and 3 will be heated from the existing plant heating system which is independent of the structure disclosed in this specification. The heat which is picked up by the return air duct in zones 2 and 3 from the existing plant heating system is thus also provided to zone 1. Temperature transmitter 136 operates through a two-stage controller. The first stage starts fan 104 to provide proper air circulation to and from all the zones. Duct furnace 130 will be started only if the temperature in duct 124 is below the setting of temperature transmitter 136. Fan 104 is always in operation when fan 95 is in operation, but as noted above, fan 104 will operate by itself in an auxiliary heating mode in response to temperature transmitter 136 when fan 95 is shut down, which may occur under conditions noted above, or during night shut-down of the plant.

Cooling apparatus is also incorporated into the present system for the purpose of both providing cooling to the web press and also providing cooling for dehemidification purposes. The cooling system utilizes the cooling capacity of water drawn from a supply well on the premises of the printing plant. In this respect, there is usually a subterranean water source having a temperature of between about 52° F. to 55° F., the exact temperature being determined by geophysical conditions. The temperature of the subsurface water will thus permit it to be utilized for cooling purposes. Thus, a supply well 139 is provided on the premises and water therefrom is pumped by pump 140 via conduit 141 which is in communication with conduit 142 leading to cooling coil unit 131 in heating duct 126. The cold water in cooling coil 131 will dehumidify the air passing thereover and thus provide air of a proper humidity to zone 2. The humidity is regulated by humidistat 137 in zone 2. As noted above, it is necessary to maintain the proper humidity in zone 2 because this is the area in which paper sheet feeding occurs, and the accuracy of the sheet feeding depends on the control of humidity, because paper varies in length with changes in humidity. The exhaust water from coil 131 passes to conduit 143 and through control valve 144 to a recharge well 145 via conduit 146. Control valve 144 is responsive to humidistat 137 in zone 2, and it modulates the flow therethrough to maintain the temperature at cooling coil 131 at the proper value. A manual bypass loop 147 having a normally closed valve 148 is in parallel with valve 144 to permit bypass of this valve if necessary. It is to be especially noted that the water which is drawn from supply well 139 never comes into contact with any foreign subject matter, that is, it is confined entirely within the conduit system, so that it can be dumped back into the recharge well 145 in an uncontaminated state. As can be seen from the drawing, there are a number of conduits, 150, 151 and 152 tapped into conduit 141 so that cool water can be conducted to other parts of the plant for required environmental cooling purposes, thereby obviating the necessity for actual refrigeration apparatus.

A chill roll stand 153 is associated with the web press and is utilized for cooling the printed ink to aid in its drying. The chill roll stand 153 is supplied with water from supply well 139 by pump 154 through conduits 141, 155, 156, three-way valve 157, conduit 159 and conduit 160. The water leaving chill roll stand 153 passes through conduits 161 and 162, normally open valve 163, conduits 164 and 165, and conduit 146 to the recharge well 145. The control valve 157 and the circulating pump 154 are activated upon starting of the web press. Valve 157 is of the type which can be caused to modulate in response to the temperature sensed by temperature transmitter 166 in conduit 162 so that a certain amount of water is recirculated to valve 157 through conduit 177 to regulate the temperature in conduit 162. It is to be noted that a plurality of conduits 173, 174, and 175 lead from conduit 165 for providing cooled water to other parts of the plant as required. If valve 157 does not accept water from conduit 156, the cool water from conduit 155 flows into bypass conduit 176 which is in communication with return conduit 165.

A normally closed valve 172 is in conduit 171 leading to conduit 160, and a normally closed valve 167 is in conduit 170 which is in communication with conduit 161. Conduits 170 and 171 are in communication with a source of water which is cooled by refrigeration apparatus associated with the web press, and which can cool the water source to provided cool water to the chill roll stand when valves 167 and 172 are open. When the refrigeration system is being used, valves 163 and 163' are closed to isolate the well water source. By the use of the well water source during most conditions of operation, the energy otherwise required for the refrigeration systems is not utilized.

Unless otherwise noted, all temperature transmitters and pressure transmitters referred to above are essentially electrical switching devices which perform a switching function in response to the sensing of predetermined temperature and pressure conditions, respectively.

It can thus be seen that the improved system of the present invention is manifestly capable of achieving the above-enumerated objects, and while preferred embodiments of the present invention have been disclosed, it will be appreciated that the present invention is not limited thereto but may be otherwise embodied within the scope of the following claims.

What is claimed is:

1. A heating system for a manufacturing plant comprising an incinerator for incinerating waste products generated as a result of the operations of the plant, exhaust duct means for conducting heated gases from said incinerator, a heat treating apparatus, heat exchange means for transferring heat from said heated gases in said exhaust duct means to air to be supplied to said heat treating apparatus, first duct means for conducting heated air from said heat exchange means to said heat treating apparatus, and second duct means for conducting solvent-laden air from said heat treating apparatus to said incinerator to burn off solvents in said solvent-laden air.

2. A plant heating system as set forth in claim 1 including pollution control burner means, and third duct means for conducting solvent-laden air to said pollution control burner means to burn off said solvents before exhausting said air to the atmosphere.

3. A plant heating system as set forth in claim 1 including second heat exchange means for transferring heat from said heated gases in said exhaust duct means to air to be supplied for heating said printing plant, and third duct means for conducting heated air from said heat exchange means to various areas of said printing plant.

4. A plant heating system as set forth in claim 3 including a supply well constituting a source of cooling water, a cooling coil in said third duct means, first conduit means for supplying cooling water from said well to said cooling coil for dehumidifying heated air in said third duct means, a recharge well, and second conduit means for directing cooling water from said cooling coil to said recharge well in an uncontaminated state.

5. A plant heating system as set forth in claim 4 including humidity measuring means for measuring humidity in said plant, and control means operatively coupled to said humidity measuring means for controlling the amount of cooling water flowing to said cooling coil.

6. A plant heating system as set forth in claim 3 including forth duct means for recirculating air from said plant to said third duct means.

7. A plant heating system as set forth in claim 6 including damper means in said fourth duct means, and control means responsive to the temperature of air in said third duct means for apportioning the amount of air from said fourth duct means supplied to said third duct means.

8. A plant heating system as set forth in claim 7 including bypass duct means between said third and fourth duct means, second damper means in said bypass duct means, pressure control means in said third duct means for controlling the position of said second damper means to maintain the proper pressure in said third duct means.

9. A plant heating system as set forth in claim 8 wherein said plant includes a plurality of heating areas, and wherein said third duct means includes fifth duct means for conducting heated air to each of said plurality of heating areas, third damper means in the duct means in each of said areas, and wherein the position of said second damper means is responsive to the collective flow of heated air to each of said areas as controlled by said third damper means.

10. A plant heating system as set forth in claim 7 including outside air makeup duct means in communication with said third duct means through said second heat exchange means for supplying outside air to be heated by said second heat exchange means, second damper means in said outside air makeup duct means for varying the flow of outside makeup air through said outside air makeup duct means, and means responsive to the temperature of air in said third duct means as sensed by temperature sensing means for controlling the position of said second damper means.

11. A plant heating system as set forth in claim 10 including bypass duct means between said outside air duct means and said third duct means for conducting outside makeup air from said outside air duct means to said third duct means without causing said outside makeup air to pass through said second heat exchange means, third damper means in said bypass duct means, and means responsive to the temperature of air in said third duct means for controlling the position of said third damper means.

12. A plant heating system as set forth in claim 3 including control means for maintaining a proper pressure in said exhaust duct means.

* * * * *